(12) United States Patent
Haneda et al.

(10) Patent No.: US 10,839,663 B2
(45) Date of Patent: Nov. 17, 2020

(54) INFORMATION PROVIDING APPARATUS AND INFORMATION PROVIDING METHOD

(71) Applicant: HONDA MOTOR CO., LTD., Tokyo (JP)

(72) Inventors: Satoshi Haneda, Wako (JP); Makoto Yamamura, Wako (JP); Takamasa Udagawa, Wako (JP); Satoshi Onodera, Tokyo (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/473,290

(22) PCT Filed: Dec. 13, 2017

(86) PCT No.: PCT/JP2017/044776
§ 371 (c)(1),
(2) Date: Jun. 25, 2019

(87) PCT Pub. No.: WO2018/123600
PCT Pub. Date: Jul. 5, 2018

(65) Prior Publication Data
US 2020/0143650 A1    May 7, 2020

(30) Foreign Application Priority Data
Dec. 27, 2016   (JP) .................. 2016-253721

(51) Int. Cl.
*G08B 21/02*    (2006.01)
*G06F 3/14*     (2006.01)
(Continued)

(52) U.S. Cl.
CPC ............... *G08B 21/02* (2013.01); *G06F 3/14* (2013.01); *G06F 3/16* (2013.01); *G06K 9/00671* (2013.01); *G08B 7/06* (2013.01)

(58) Field of Classification Search
CPC .. G08B 21/02; G08B 7/06; G06F 3/14; G06F 3/16; G06K 9/00671
(Continued)

(56) References Cited

U.S. PATENT DOCUMENTS

2008/0130954 A1   6/2008  Taniguchi et al.
2011/0150348 A1*  6/2011  Anderson ............ G05D 1/0088
                                                          382/224
(Continued)

FOREIGN PATENT DOCUMENTS

EP    1136194 A1    9/2001
JP    2007-003450 A  1/2007
JP    2015-080154 A  4/2015

*Primary Examiner* — Omar Casillashernandez
(74) *Attorney, Agent, or Firm* — Carrier Blackman & Associates, P.C.; Joseph P. Carrier; Jeffrey T. Gedeon

(57) ABSTRACT

An information providing apparatus (100) includes: an organism recognizing unit (12) recognizing an organism in an outside world; a harmfulness level detecting unit (14) detecting a harmfulness level of the organism recognized by the organism recognizing unit (12); an emotion generating unit (15) generating an emotion that a device (1) is assumed to have in accordance with the harmfulness level detected by the harmfulness level detecting unit (14); and an emotion output unit (16) outputting the emotion produced by the emotion generating unit (15) in a mode recognizable by a user.

15 Claims, 6 Drawing Sheets

(51) Int. Cl.
*G06F 3/16* (2006.01)
*G06K 9/00* (2006.01)
*G08B 7/06* (2006.01)

(58) Field of Classification Search
USPC ........................................................ 340/540
See application file for complete search history.

(56) References Cited

U.S. PATENT DOCUMENTS

| | | | |
|---|---|---|---|
| 2014/0285667 A1* | 9/2014 | Aimura | G08G 1/16 348/148 |
| 2015/0293359 A1 | 10/2015 | Ding et al. | |
| 2016/0142407 A1* | 5/2016 | Chun | H04L 63/0861 726/5 |
| 2016/0363914 A1* | 12/2016 | Kim | A61B 5/681 |
| 2017/0323161 A1* | 11/2017 | Du | G08B 13/1672 |
| 2018/0077860 A1* | 3/2018 | Einecke | A01D 34/008 |
| 2018/0211414 A1* | 7/2018 | Cronin | G05D 1/021 |

* cited by examiner

US 10,839,663 B2

INFORMATION PROVIDING APPARATUS AND INFORMATION PROVIDING METHOD

CROSS-REFERENCE TO RELATED APPLICATION

This application is a National Stage of PCT international application Ser. No. PCT/JP2017/044776 filed on Dec. 13, 2017 which designates the United States, incorporated herein by reference, and which is based upon and claims the benefit of priority from Japanese Patent Application No. 2016-253721, filed on Dec. 27, 2016, the entire contents of which are incorporated herein by reference.

TECHNICAL FIELD

This invention relates to an information providing apparatus and an information providing method for providing information about organisms in a mode easily recognizable by a user.

BACKGROUND ART

Apparatuses have been known that provide the user with information about organisms, such as animals or plants, included in a captured image (for example, see Patent Literature 1). An apparatus described in Patent Literature 1 extracts a characteristic part of an organism present in an area specified by the user in a previously captured image, identifies the organism by consulting a pictorial book database on the basis of the characteristic part, and outputs information corresponding to the identified organism to a user terminal.

CITATION LIST

Patent Literature

Patent Literature 1: Japanese Unexamined Patent Publication No. 2015-080154

DISCLOSURE OF INVENTION

Problems to be Solved by the Invention

For example, if a user encounters a harmful organism outdoors, it is preferred to provide the user with information about the harmfulness of the organism in a mode easily recognizable by the user. Unfortunately, the apparatus of Patent Literature 1 above does not make any proposal on this point.

Means for Solving Problem

An aspect of the present invention is an information providing apparatus for providing a user with an information about organisms using a device positioned near the user or worn by the user, including: an organism recognizing unit configured to recognize an organism in an outside world; a harmfulness level detecting unit configured to detect a harmfulness level of the organism recognized by the organism recognizing unit; an emotion generating unit configured to generate an emotion that the device is assumed to have in accordance with the harmfulness level detected by the harmfulness level detecting unit; and an emotion output unit configured to output the emotion generated by the emotion generating unit in a mode recognizable by the user.

Another aspect of the present invention is an information providing method for providing a user with an information about organisms using a device positioned near the user or worn by the user, including: recognizing an organism in an outside world; detecting a harmfulness level of the organism recognized; generating an emotion that the device is assumed to have in accordance with the harmfulness level detected; and outputting the emotion generated in a mode recognizable by the user.

Effect of the Invention

According to the present invention, information about harmfulness of organisms can be provided to a user in a mode easily recognizable by the user.

DESCRIPTION OF EMBODIMENT

First Embodiment

Figure 1:
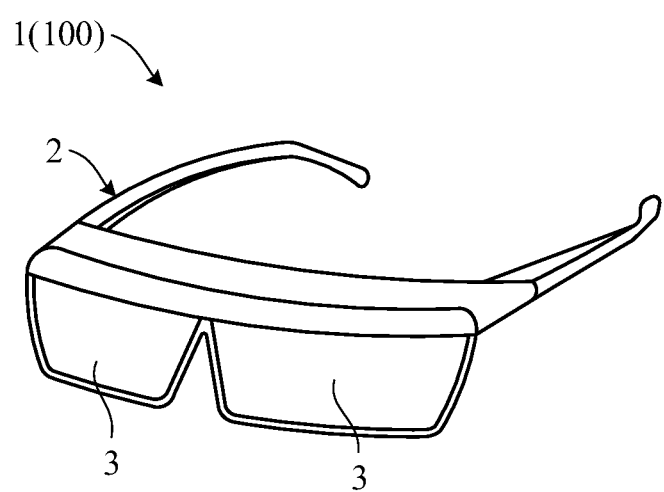
FIG. 1 is a perspective view showing a schematic configuration of a wearable device, which is an example of a device configuring an information providing apparatus according to a first embodiment of the present invention.

Now, a first embodiment of the present invention will be described with reference to FIGS. 1 to 3. FIG. 1 is a perspective view showing a schematic configuration of a wearable device 1, which is an example of a device configuring an information providing apparatus 100 according to the first embodiment of the present invention. The information providing apparatus 100 recognizes organisms in the outside world and provides the user with information corresponding to the harmfulness of the organisms through the device.

As shown in FIG. 1, the wearable device 1 includes an eyeglass-shaped frame 2 mounted on the head of the user and a pair of displays 3 for the left and right eyes mounted on the frame 2 and takes an eyeglass shape as a whole. Also mounted on the frame 2 are a camera, a microphone, a speaker, a communication unit, a control unit, and the like (see FIG. 2A).

With the wearable device 1 mounted on the user, the displays 3 are disposed immediately in front of the eyes of the user, that is, in the positions of common eyeglass lenses. The displays 3 are, for example, transmission color liquid crystal panels. By controlling the transmittance thereof, the displays 3 can be brought into a transparent or semi-transparent transmission state. By bringing the displays 3 into a transmission state, the user can directly visually recognize the surroundings through the displays 3, as when wearing common eyeglasses, and can directly observe organisms by himself or herself.

Various types of information can be displayed on the displays 3 so as to be superimposed on the sight of the user. For example, an emotion that the wearable device 1 is assumed to have (device emotion) can be displayed using a character image. Information about organisms recognized by the camera or microphone can also be displayed on the displays 3.

Figure 2A:
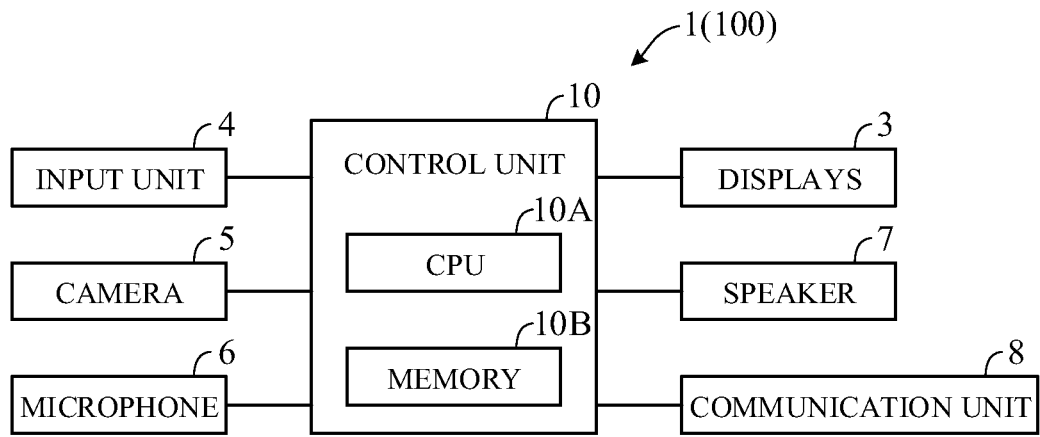
FIG. 2A is a block diagram showing a schematic configuration of the information providing apparatus of FIG. 1.

FIG. 2A is a block diagram showing a schematic configuration of the information providing apparatus 100 in FIG. 1. As shown in FIG. 2A, the displays 3, as well as an input unit 4, a camera 5, a microphone 6, a speaker 7, and a communication unit 8 are connected to a control unit 10. The wearable device 1 is also provided with a power supply and the like (not shown).

The input unit 4 includes various operation members operated by the user, for example, a switch for turning on the power and a switch for setting the wearable device 1. Through the input unit 4, the user can set the area in which the wearable device 1 is used (e.g., the country name or prefecture name), the surrounding environment (e.g., farms, rivers, seas, etc.), and the use conditions, such as the season and weather.

The camera 5 includes an image sensor, such as a CCD sensor or CMOS sensor, and is mounted on, for example, an upper portion of the displays 3 outward so as to agree with the line of sight of the user. Thus, the camera 5 captures an image in a range corresponding to the sight of the user through the displays 3.

The microphone 6 acquires a speech uttered by the user. A speech signal inputted through the microphone 6 is processed by a speech recognition unit (not shown) in the control unit 10. Thus, details of the speech of the user are recognized.

For example, when the user makes a speech output request through the microphone 6, the speaker 7 outputs a speech to the user in response to the request. Even if there is no speech output request from the user, the speaker 7 may automatically output a speech in accordance with an instruction from the control unit 10. The speaker 7 can output a speech corresponding to the device emotion. The speaker 7 may be formed as earphones mounted on the ears of the user.

The communication unit 8 communicates with an external device through, for example, a wireless LAN or a wireless public line, such as an Internet line.

Figure 2B:
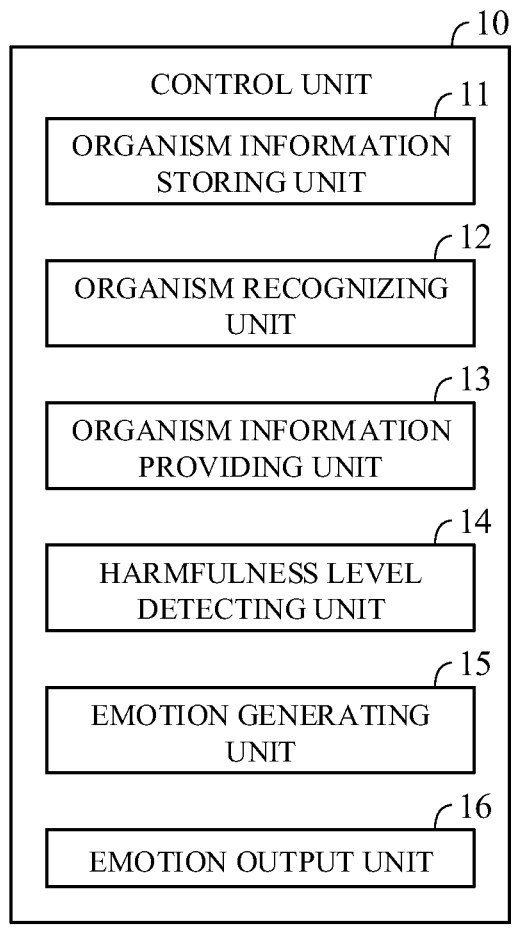
FIG. 2B is a block diagram showing a functional configuration of an ECU of FIG. 2A.

The control unit 10 includes a CPU (processor) 10A, a memory 10B such as ROM or RAM, other peripheral circuits, and the like. FIG. 2B is a block diagram showing the functional configuration of the control unit 10. As shown in FIG. 2B, the control unit 10 includes an organism information storing unit 11, an organism recognizing unit 12, an organism information providing unit 13, a harmfulness level detecting unit 14, an emotion generating unit 15, and an emotion output unit 16. Among these, the organism recognizing unit 12, organism information providing unit 13, harmfulness level detecting unit 14, emotion generating unit 15, and emotion output unit 16 are functions performed by the CPU 10A, and the organism information storing unit 11 is a function performed by the memory 10B.

The organism information storing unit 11 configures a database that stores information about organisms, such as animals and plants, present in the outside world (organism information). The stored organism information includes the names, species, appearances and shapes, cries, habitats or distribution areas, harmfulness (harmfulness information), and the like of the organisms. The harmfulness information includes not only information about whether the respective organisms are harmful or harmless, but also information indicating the levels of harmfulness of the organisms. The harmfulness information is stored for each organism.

The levels of harmfulness can be categorized into, for example, three levels A, B, and C. The level A represents the highest level of harmfulness, and the level C represents the lowest level of harmfulness. Specifically, poisonous organisms, or organisms that give pain to a human who contacts or approaches them are most harmful and therefore are categorized into the level A. Organisms that are not poisonous or do not give pain but give an adverse effect, such as adhesion of smell or stain, to a human who contacts them are categorized into the level B. Other organisms that are not categorized into the level A or B are harmless or less harmful and therefore are categorized into the level C. In other words, organisms having harmfulness levels exceeding a predetermined threshold are categorized into the level A or B, and organisms having harmfulness levels equal to or lower than the threshold are categorized into the level C.

The organism recognizing unit 12 recognizes organisms present near the user in the outside world on the basis of signals from the camera 5 and microphone 6. Specifically, by extracting a characteristic part of an image acquired by the camera 5 and characteristic part of a speech (cry) acquired by the microphone 6, the organism recognizing unit 12 determines whether the image includes an image corresponding to the appearance of an organism stored in the organism information storing unit 11 and whether the speech includes a speech corresponding to the speech of an organism stored in the organism information storing unit 11. In this case, organisms are easily retrieved by narrowing the search scope in the organism information storing unit 11 using the use conditions of the wearable device 1, such as information about the current location inputted through the input unit 4 (the area, environment, or the like) or information about the weather.

The organism information providing unit 13 reads information corresponding to the organism recognized by the organism recognizing unit 12 from the organism information storing unit 11 and outputs the information to the displays 3. Thus, organism information, such as the name or species, of the recognized organism, is displayed on the displays 3, that is, the organism information is provided to the user. The organism information may be outputted as a speech through the speaker 7.

The harmfulness level detecting unit 14 detects the level of harmfulness of the organism recognized by the organism recognizing unit 12 with reference to the harmfulness levels (levels A, B, and C) of the organisms previously stored in the organism information storing unit 11.

The emotion generating unit 15 generates an emotion that the wearable device 1 is assumed to have (device emotion), in accordance with the harmfulness level detected by the harmfulness level detecting unit 14. For example, the emotion generating unit 15 categorizes the device emotions into eight basic emotions (anticipation, joy, acceptance, fear, surprise, sadness, disgust, and anger) and application emotions consisting of adjacent pairs of these emotions using the wheel of emotions of Plutchik and generates a device emotion on the basis of those emotions. Specifically, if the harmfulness level of the organism is the level C, the emotion generating unit 15 generates a favorable emotion (comfortable emotion), such as joy; if the harmfulness level of the organism is the level A or B, it generates an uncomfortable emotion, such as disgust. Also, if the harmfulness level of the organism is the level A, it generates a higher level of uncomfortable emotion than that when the harmfulness level is the level B. Also, if a rare or cute organism whose harmfulness level is the level C is recognized, it generates a higher level of comfortable emotion.

The emotion output unit 16 displays, on the displays 3, a character image that changes in accordance with the emotion generated by the emotion generating unit 15. That is, the emotion output unit 16 generates an image signal corresponding to the character image and outputs the image signal to the displays 3. A facial-expression image representing only the facial expression of a character that imitates a human, animal, or the like, or a whole-body image representing the whole body of a character may be used as a character image. For example, if a comfortable emotion is generated, a facial-expression image representing a joyful facial expression of a character is displayed on the displays 3; if an uncomfortable emotion is generated, a facial-expression image representing a disgusted facial expression of a character is displayed on the displays 3. Also, if a higher level of comfortable emotion is generated, an emphasized joyful facial expression of a character is displayed; if a higher level of uncomfortable emotion is generated, an emphasized disgusted facial expression of a character is displayed.

The emotion output unit 16 may change not only the design of the character image but also the color thereof in accordance with the emotion generated by the emotion generating unit 15. For example, if the emotion generating unit 15 generates a higher level of uncomfortable emotion, the emotion output unit 16 may bring the color of the image closer to red in order to emphasize the meaning as an alarm. The emotion output unit 16 may display a comfortable emotion in a warm color and an uncomfortable emotion in a cold color. In this case, it may display a higher level of comfortable emotion in a warmer color and a higher level of uncomfortable emotion in a colder color. Also, the emotion output unit 16 may change the display pattern of the character image to flashing, lighting, or the like in accordance with the emotion generated by the emotion generating unit 15.

The emotion output unit 16 may output a speech corresponding to the emotion generated by the emotion generating unit 15 from the speaker 7. That is, the emotion output unit 16 may generate a speech signal corresponding to the emotion and output the speech signal to the speaker 7. For example, if an uncomfortable emotion whose level reaches a predetermined level is generated, for example, due to recognition of an organism whose harmfulness level is the level A, the emotion output unit 16 may output a speech of "dangerous" or the like, or a warning sound such as a buzzer sound, from the speaker 7.

Figure 3:
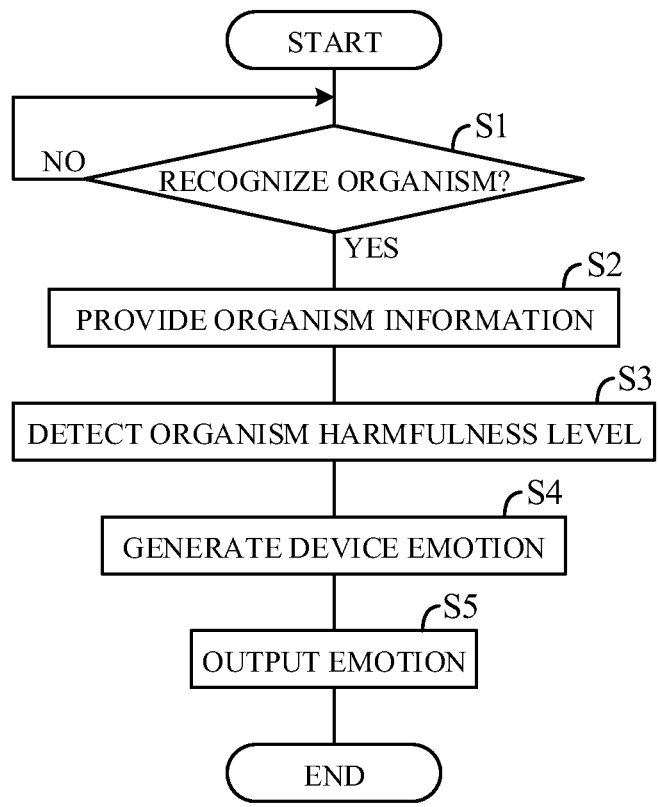
FIG. 3 is a flowchart showing an example of process performed by a CPU of FIG. 2A.

FIG. 3 is a flowchart showing an example of a process performed by the control unit 10 (CPU 10A) in accordance with a previously stored program. The process shown in this flowchart is started, for example, when the wearable device 1 is turned on.

First, in step S1, the organism recognizing unit 12 determines whether an organism has been recognized, by referring to information in the organism information storing unit 11 on the basis of signals from the camera 5 and microphone 6. Step S1 is repeated until the determination becomes YES. When the determination in step S1 becomes YES, the process proceeds to step S2. In step S2, organism information corresponding to the recognized organism is read from the organism information storing unit 11 and outputted to the displays 3 or speaker 7. That is, the organism information is provided to the user.

Then, in step S3, the level of harmfulness of the organism recognized in step S1 is read from the organism information storing unit 11 and detected. Then, in step S4, a device emotion (a comfortable emotion, an uncomfortable emotion, etc.) that the wearable device 1 is assumed to have is generated in accordance with the detected level of harmfulness. Then, in step S5, an image signal of a character image corresponding to the generated emotion is generated and outputted to the displays 3. Thus, the character image is displayed on the displays 3. In step S5, a speech signal corresponding to the generated emotion may be generated and outputted to the speaker 7.

An example of the operation of the information providing apparatus 100 according to the present embodiment will be described more specifically. If the user (e.g., a child) finds a rare animal (an insect, etc.) or plant outdoors with the wearable device 1 mounted on the user, the wearable device 1 recognizes the organism through an image captured by the camera or a speech collected by the microphone (step S1) and outputs organism information corresponding to the organism to the user through the displays 3 or speaker 7 (step S2). Thus, the user is able to recognize the name, species, or the like of the organism while seeing the real object, that is, the user is able to use the wearable device 1 as a learning tool.

At this time, if the recognized organism is harmful, a character image representing an uncomfortable emotion (e.g., a disgusted feeling) that the wearable device 1 is assumed to have is displayed on the displays 3, or a speech representing such an uncomfortable emotion is outputted from the speaker 7 (step S5). Thus, the user is able to easily recognize the harmfulness of the organism even if the user does not recognize the organism information provided in step S2. In particular, if the user is a child, outputting the emotion of the wearable device 1 using a character image or the like allows the child to intuitively recognize the harmfulness of the organism. Thus, the user would avoid an inappropriate act, such as a touch on the organism, thereby increasing the usefulness of the wearable device 1. That is, even if the user does not have any knowledge about the harmfulness of an organism that the user sees for the first time, he or she can act outdoors with a feeling of safety.

On the other hand, if the recognized organism is a harmless, cute organism, a character image representing a virtual comfortable emotion (e.g., joy) that the wearable device 1 is assumed to have is displayed on the displays 3, or a speech representing such a comfortable emotion is outputted from the speaker 7 (step S5). Thus, the user shares the comfortable emotion with the wearable device 1, increasing the level of satisfaction with the wearable device 1.

The present embodiment can produce the following advantageous effects:

(1) The information providing apparatus 100 provides the user with information about organisms using the wearable device 1 worn by the user (FIG. 1). The information providing apparatus 100 includes the organism recognizing unit 12 that recognizes organisms in the outside world, the harmfulness level detecting unit 14 that detects the level of harmfulness of the organism recognized by the organism recognizing unit 12, the emotion generating unit 15 that generates an emotion that the wearable device 1 is assumed to have, in accordance with the level of harmfulness detected by the harmfulness level detecting unit 14, and the emotion output unit 16 that outputs the emotion generated by the emotion generating unit 15 in a mode recognizable by the user (FIGS. 2A, 2B). According to this configuration, if the user encounters a harmful organism, the emotion of the wearable device 1 to be transmitted to the user is changed. Thus, information about the harmfulness of the organism can be provided to the user in a mode easily recognizable by the user.

(2) The wearable device 1 includes the displays 3 (FIG. 1). The emotion output unit 16 displays, on the displays 3, a character image that changes in accordance with the emotion generated by the emotion generating unit 15 (step S5). Thus, the user is able to easily recognize the harmfulness of the organism while seeing a change in the facial expression of the character image, or the like, regardless of the age of the user.

(3) The wearable device 1 includes the speaker 7 (FIG. 2A). The emotion output unit 16 outputs a speech corresponding to the emotion generated by the emotion generating unit 15 from the speaker 7 (step S5). Thus, the user is able to immediately determine the harmfulness of the organism using the simple configuration.

(4) If the harmfulness level detecting unit 14 detects a harmfulness level exceeding the threshold, that is, a harmfulness level which is the level A or B, the emotion generating unit 15 generates a disgusted device emotion (step S4). By generating a disgusted device emotion when the level of harmfulness is high, as described above, the level of harmfulness of the organism and the device emotion are favorably associated with each other. Thus, the user is able to favorably recognize the level of harmfulness of the organism through the device emotion.

(5) The information providing apparatus 100 also includes the organism information providing unit 13 that provides information about the organism recognized by the organism recognizing unit 12 (FIG. 2B). Thus, the user is able to grasp the species or the like of the organism that the user sees for the first time, that is, the user is able to favorably use the wearable device 1 as a learning tool.

(6) The wearable device 1 is provided with the camera 5 and microphone 6 (FIG. 2A). Thus, the wearable device 1 (organism recognizing unit 12) is able to recognize organisms present near the user from the appearance and shape, cry, or the like.

(7) Since the wearable device 1 worn by the user is used as the information providing apparatus 100 (FIG. 1), the range in which the eyes or ears of the user recognize organisms and the range in which the wearable device 1 recognizes organisms can be matched with each other. Thus, information such as the harmfulness level or the like of organisms can be properly provided to the user.

(8) An information providing method for providing the user with information about organisms using the wearable device 1 worn by the user includes recognizing organisms in the outside world (step S1), detecting the level of harmfulness of the recognized organism (step S3), generating an emotion that the wearable device 1 is assumed to have, in accordance with the detected level of harmfulness (step S4), and outputting the generated emotion in a mode recognizable by the user (step S5). Thus, information about the harmfulness of the organism can be provided to the user in a mode easily recognizable by the user.

Second Embodiment

A second embodiment of the present invention will be described with reference to FIGS. 4 to 6. Hereafter, the difference between the second and first embodiments will be mainly described. In the first embodiment, information about organisms is provided to the user using the wearable device 1; in the second embodiment, information about organisms is provided to the user using a device located near the user (e.g., a working machine that works near the user).

Figure 4:
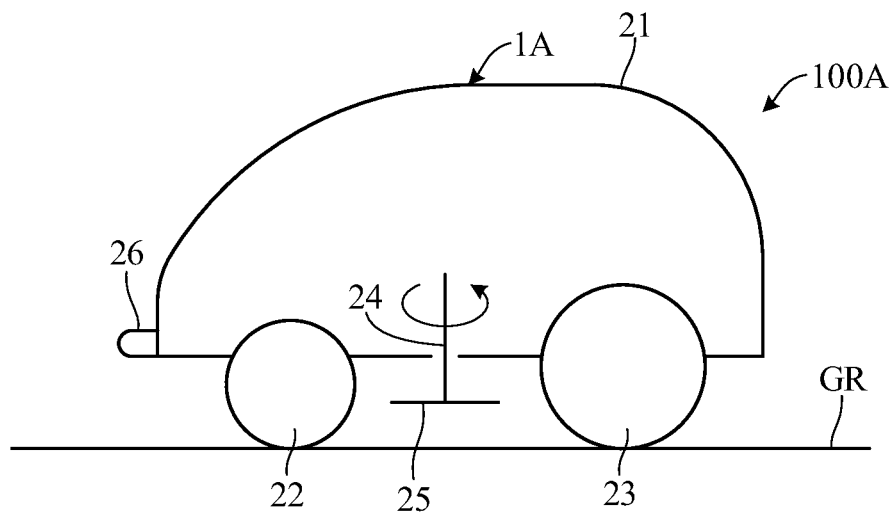
FIG. 4 is a side view showing a schematic configuration of a working machine, which is an example of a device configuring an information providing apparatus according to a second embodiment of the present invention.

FIG. 4 is a side view showing a schematic configuration of a working machine 1A, which is an example of a device configuring an information providing apparatus 100A according to the second embodiment of the present invention. The working machine 1A is a lawn mower that mows the lawn while autonomously traveling within a working area.

As shown in FIG. 4, the working machine 1A includes a body 21, a pair of left and right front wheels 22, and a pair of left and right rear wheels 23. The working machine 1A has a weight and size such that any user can carry it with his or her hands. In an example, the working machine 1A has an overall length of about 500 mm, an overall width of about 300 mm, and a height of about 300 mm A disc-shaped, lawn mowing blade 25 supported by a rotating shaft 24 protrudes toward the ground (lawn ground) GR from the bottom of the body 21. The working machine 1A is able to mow the lawn by rotating the blade 25 while traveling on the ground GR. The front end of the body 21 is provided with charging terminals 26 for charging a battery mounted on the body 21.

Figure 5A:
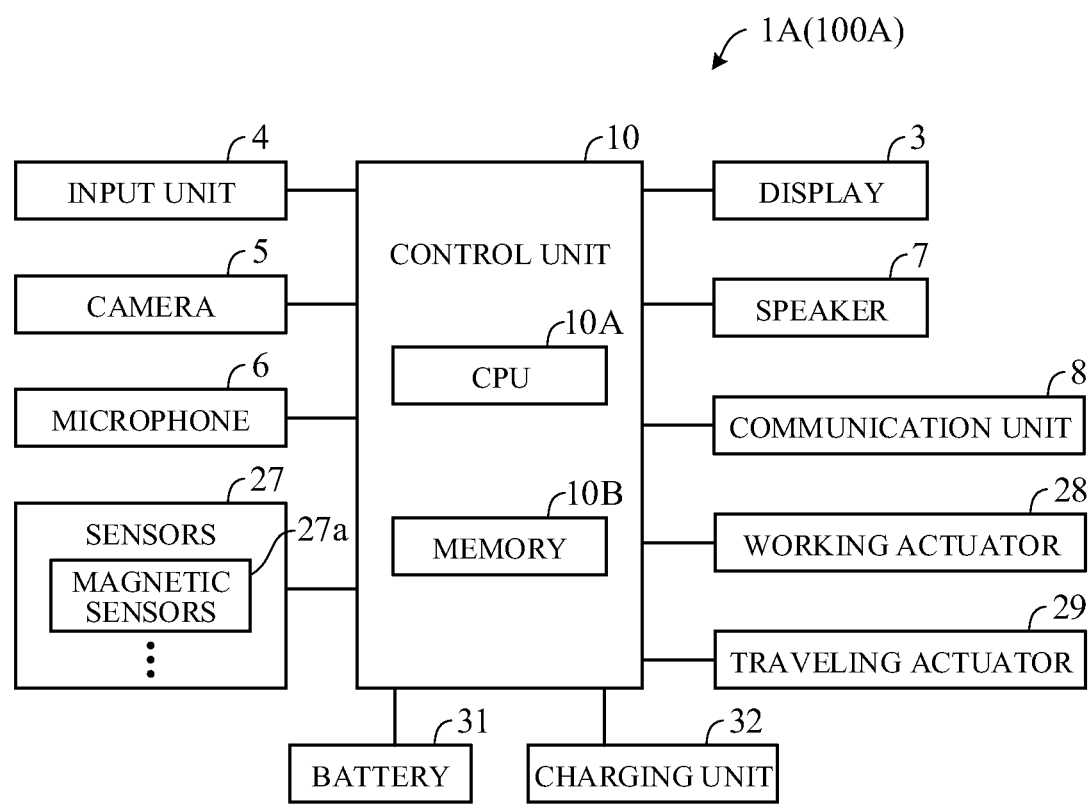
FIG. 5A is a block diagram showing a schematic configuration of the information providing apparatus of FIG. 4.

FIG. 5A is a block diagram showing a schematic configuration of the information providing apparatus 100A in FIG. 4. In FIG. 5A, components having substantially the same configurations as those in FIG. 2A are given the same reference signs. As shown in FIG. 5A, as with the wearable device 1 (FIG. 2A), the working machine 1A includes a control unit 10 and also includes a display 3, an input unit 4, a camera 5, a microphone 6, a speaker 7, and a communication unit 8 that are connected to the control unit 10. The working machine 1A also includes sensors 27, a working actuator 28, a traveling actuator 29, a battery 31, and a charging unit 32 that are connected to the control unit 10. All these components are mounted on a body 21. The display 3 is disposed in a position in which the user can easily see it, for example, on the top surface of the body 21.

The sensors 27 include a pair of magnetic sensors 27a spaced from each other in the vehicle width direction, and the magnetic sensors 27a detect the magnetic field strength. Although not shown, the sensors 27 also include a Yaw sensor that detects the angular velocity around an axis in the height direction of the working machine 1A, a G sensor that detects the acceleration that acts on the working machine 1A, an azimuth sensor that detects the azimuth of the working machine 1A, a contact sensor that detects whether the working machine 1A has contacted an obstacle, a wheel speed sensor that detects the wheel speed of the left and right rear wheels 23, a GPS sensor that detects the position of the working machine 1A, a voltage sensor that detects the remaining voltage of the battery 31, and the like.

The working actuator 28 comprises an electric motor coupled to the rotating shaft 24. The blade 25 is rotationally driven by driving the working actuator 28. The traveling actuator 29 comprises a pair of electric motors that are disposed inside the left and right rear wheels 23 in the left-right direction and independently drive the left and right rear wheels 23. The working machine 1A can be turned in any direction by making a difference in rotation speed between the left and right rear wheels 23. The battery 31 is used as a power supply for supplying power to the electric components of the working machine 1A. The charging unit 32 stores power supplied through the charging terminals 26 in the battery 31.

Figure 5B:
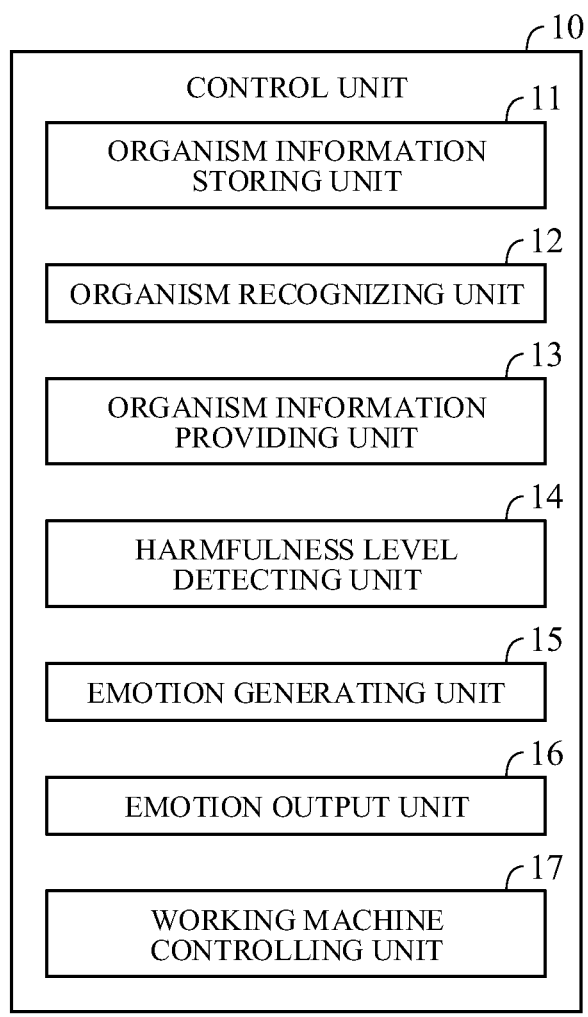
FIG. 5B is a block diagram showing a functional configuration of an ECU of FIG. 5A.

FIG. 5B is a block diagram showing the functional configuration of the control unit 10 of FIG. 5A. As shown in FIG. 5B, the control unit 10 includes the organism information storing unit 11, the organism recognizing unit 12, the organism information providing unit 13, the harmfulness level detecting unit 14, the emotion generating unit 15 and the emotion output unit 16, and further includes a working machine controlling unit 17. The working machine controlling unit 15 is a function performed by the CPU 10A. The working machine controlling unit 15 outputs control signals to the working actuator 28 and the traveling actuator 29 so as to control operation of the working machine 1A.

The working machine 1A thus configured works while autonomously traveling within a predetermined working area. FIG. 6 is a plan view showing an example of a working area AR. The working area AR is defined by an area wire 33 previously installed in the garden (e.g., buried at a predetermined depth from the ground), and the travel range of the working machine 1A is defined by the area wire 33. A magnetic field is generated in the working area AR by passing a current through the area wire 33. The magnetic field strength of the working area AR is detected by the magnetic sensors 27a.

The magnetic field strength changes in accordance with the distance from the area wire 33. The control unit 10 (CPU 10A) determines whether the working machine 1A has reached the area wire 33, on the basis of signals from the magnetic sensors 27a. If it determines that the working machine 1 has reached the area wire 33, the control unit 10 outputs control signals to the traveling actuator 29 to turn the working machine 1A toward the inside of the working area AR, as shown by an arrow in FIG. 6, and thus the working machine 1A autonomously travels in the working area AR. At this time, the control unit 10 outputs control signals also to the working actuator 28 and thus the working machine 1A automatically mows the lawn while traveling within the working area AR. A charging station 34 for charging the battery 31 is disposed on the area wire 33.

As described above, the working area AR is set by installing the area wire 33, and the working machine 1A (control unit 10) works while recognizing the working area AR in accordance with the signals from the magnetic sensors 27a. However, the method for setting and recognizing the working area is not limited to that described above. For example, the control unit 10 may receive a beacon signal through the communication unit 8, and the working machine 1A may work in the working area while recognizing the working area using the received signal. Also, a map of the working area may be previously stored in a memory of the control unit 10, and the working machine 1A may work in the working area while detecting its own position using a GPS sensor or the like. That is, the working area may be set using a working area setting unit other than the area wire 33, and the working machine may work while recognizing the working area using a position detector other than the magnetic sensors.

Figure 6:
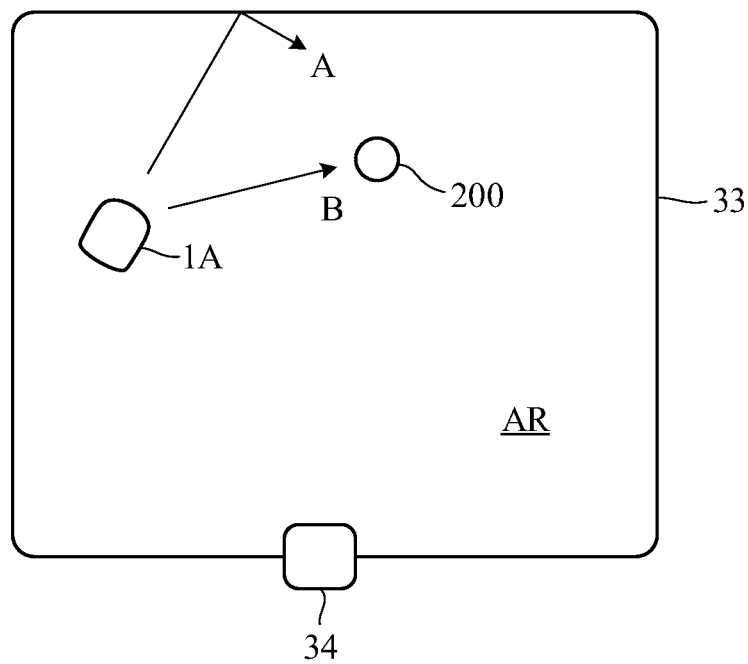
FIG. 6 is a plan view showing an example of a working area for a work by the working machine of FIG. 4.

The working machine 1A is able to operate in a normal working mode in which it works while autonomously traveling, as well as in a follow travel mode in which it travels while following the user 200 detected by the camera 5, as shown by an arrow B in FIG. 6. For example, if the working machine 1A recognizes organisms through the camera 5 or microphone 6 in the follow travel mode, it generates a device emotion corresponding to the level of harmfulness of that organism. The working machine 1A then displays a character image corresponding to the device emotion together with organism information on the display 3. Or, the working machine 1A outputs a speech corresponding to the device emotion from the speaker 7. Thus, the user 200 is able to recognize the device emotion of the working machine 1A.

As seen above, in the second embodiment, the working machine 1A configures the information providing apparatus 100A, and the lawn mower that mows the lawn while autonomously traveling within the working area AR configures the working machine 1A. Thus, information about the level of harmfulness of organisms in the outside world can be most properly provided to the user through the working machine 1A. That is, the working machine 1A works near the user outdoors and therefore is able to easily recognize organisms found by the user. Thus, the working machine 1A generates an emotion thereof in accordance with the level of harmfulness of organisms recognized by the working machine 1A and outputs this device emotion in a mode such as a character image or the like. As a result, the user is able to easily recognize the information about the harmfulness of the organisms.

While, in the first embodiment, information about organisms is provided to the user using the eyeglass-type wearable device 1 worn by the user, the wearable device need not be of the eyeglass type and may be of any type (e.g., a watch type, a type in which the wearable device is suspended from the neck, etc.). While, in the second embodiment, information about organisms is provided to the user using the working machine (lawn mower) 1A that works near the user, a working machine other than a lawn mower, or a travelable moving body other than a working machine may be used. That is, information about organisms can be provided to the user using any type of device located near the user or worn by the user as an information providing apparatus.

Figure 7:
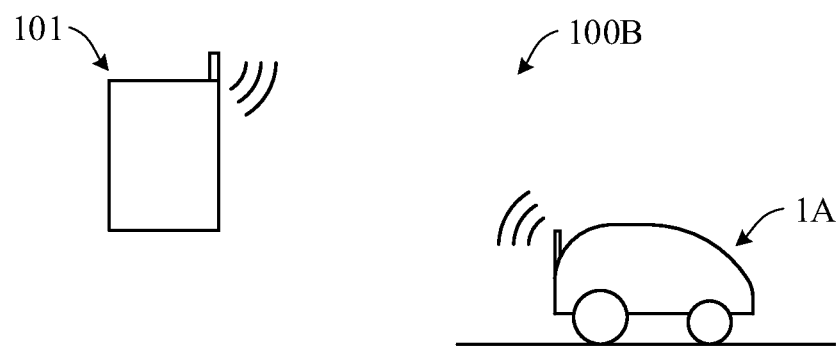
FIG. 7 is a diagram showing an example for configuring an emotion improving apparatus with a working machine and a processor.

While, in the above embodiments, the single device, such as the wearable device 1 or working machine 1A, configures the information providing apparatus 100 or 100A, multiple devices may configure an information providing apparatus. FIG. 7 is a diagram showing an example of such an information providing apparatus. In FIG. 7, a working machine 1A and a processor 101 form an information providing apparatus 100B. The processor 101 includes a control unit, a memory, a communication unit, and the like, and the working machine 1A and the processor 101 are configured to be able to wirelessly communicate with each other through the communication unit. This configuration allows the control unit 10 of the working machine 1A to obtain data from the processor 101 as necessary. Thus, part of the control unit 10 can be disposed on the processor 101, simplifying the configuration of the control unit 10. Note that the wearable device 1 and processor 101 may form an information providing apparatus.

While, in the above embodiments, the organism recognizing unit 12 recognizes organisms in the outside world on the basis of signals from the camera 5 as an imaging device and the microphone 6 as a sound collector, an organism recognizing unit is not limited to this configuration. For example, the organism recognizing unit may recognize organisms in the outside world on the basis of a signal from another type of detector, such as a thermography or smell sensor. An imaging device and a sound collector may be disposed separately from a device body including displays. While, in the above embodiments, the harmfulness level detecting unit 14 detects the level (levels A to C) of harmfulness of organisms recognized by the organism recognizing unit 12 on the basis of information previously stored in the organism information storing unit 11, a harmfulness level detecting unit is not limited to the above configuration and may detect the level of harmfulness without categorizing into these levels.

While, in the above embodiments, the emotion generating unit 15 generates an emotion of the wearable device 1 or working machine 1A in accordance with the level of harmfulness detected by the harmfulness level detecting unit 14, an emotion generating unit is not limited to the above configuration. For example, considering not only the level of harmfulness, but also the age, sex, or the like of the user, if organisms that the user is assumed to be glad to see is recognized, the emotion generating unit may generate an emotion (comfortable emotion) that can be shared with the user. While, in the above embodiments, the device emotion is generated using the wheel of emotions of Plutchik, another emotion generation method may be used. For example, the device emotion may be generated from simple two emotions consisting of an uncomfortable emotion (a disgusted emotion) and another emotion (e.g., a comfortable emotion).

While, in the above embodiments, the emotion generated by the emotion generating unit 15 is outputted to the displays 3 or speaker 7, an emotion output unit is not limited to the above configuration. The emotion output unit may output the emotion to an entity other than the displays or speaker (speech output unit) as long as the entity outputs the emotion in a mode recognizable by the user. While, in the above embodiments, the character image that changes in accordance with the device emotion is displayed on the displays 3, another type of image that changes in accordance with the device emotion may be displayed. While, in the above embodiments, the organism information providing unit 13 provides information about the organism recognized by the organism recognizing unit 12, the organism information providing unit may be omitted.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1 wearable device, 1A working machine, 3 display(s), 5 camera, 6 microphone, 7 speaker, 12 organism recognizing unit, 13 organism information providing unit, 14 harmfulness level detecting unit, 15 emotion generating unit, 16 emotion output unit, 100, 100A, 100B information providing apparatus

The invention claimed is:

1. An information providing method for providing a user with an information about organisms, comprising:
    capturing image data of an organism with an image capturing device in a vicinity of the organism;
    recognizing the organism in the vicinity of the image capturing device based on the captured image data;
    retrieving the organism information including a harmfulness level of the organism from a data storage device that stores organism information for a plurality of organisms with the organism information including at least a harmfulness level for each organism of the plurality of organisms;
    assigning an emotion to the organism that corresponds to the harmfulness level detected; and
    outputting the assigned emotion together with the organism information to a visual display of a device positioned near the user or worn by the user.

2. An information providing apparatus for providing a user with an information about organisms, comprising
    a device having a visual display positioned near the user or worn by the user;
    an image capturing device in a vicinity of an organism for capturing image data of the organism;
    a data storage device that stores organism information for a plurality of organisms, the organism information includes at least a harmfulness level for each organism of the plurality of organisms; and
    an electronic control unit having a microprocessor and a memory, wherein
    the microprocessor is configured to perform:
        recognizing the organism in the vicinity of the image capturing device based on the captured image data;
        retrieving the organism information including the harmfulness level of the organism from the organism information stored in the data storage device;
        assigning an emotion to the organism that corresponds to the harmfulness level detected; and
        outputting the assigned emotion together with the organism information to the visual display.

3. The information providing apparatus according to claim 2, wherein
    the outputting includes displaying a character image corresponding to the assigned emotion.

4. The information providing apparatus according to claim 2, wherein
    the device has a speech output unit, and
    the outputting includes outputting a speech corresponding to the assigned emotion through the speech output unit.

5. The information providing apparatus according to claim 2, wherein
    the assigning includes assigning a disgusted emotion when the harmfulness level exceeds a threshold value.

6. The information providing apparatus according to claim 2, wherein
    the recognizing is initiated in response to acquiring a speech uttered by the user with a sound collecting device installed on the device.

7. The information providing apparatus according to claim 2, wherein
    the device comprises a wearable device worn by the user.

8. The information providing apparatus according to claim 2, wherein
    the device comprises a working machine performing a work while autonomously traveling in a working area.

9. An information providing system for providing a user with an information about organisms, comprising
    a device having a visual display positioned near the user or worn by the user;
    a image capturing device in a vicinity of an organism for capturing image data of the organism;
    a data storage device that stores organism information for a plurality of organisms, the organism information includes at least a harmfulness level for each organism of the plurality of organisms; and
    an electronic control unit having a microprocessor and a memory, wherein
    the microprocessor is configured to function as:
    an organism recognizing unit configured to recognize the organism in the vicinity of the image capturing device based on the captured image data;

a harmfulness level detecting unit configured to retrieve the organism information including the harmfulness level of the organism from the organism information stored in the data storage device;

an emotion generating unit configured to assign an emotion to the organism that corresponds to the harmfulness level detected by the harmfulness level detecting unit; and an emotion output unit configured to output the assigned emotion together with the organism information to the visual display.

10. The information providing system according to claim 9, wherein
the emotion output unit is further configured to display a character image corresponding to the assigned emotion.

11. The information providing system according to claim 9, wherein
the device has a speech output unit, and
the emotion output unit is further configured to output a speech corresponding to the assigned emotion through the speech output unit.

12. The information providing system according to claim 9, wherein
the emotion generating unit is further configured to assign a disgusted emotion when the harmfulness level exceeds a threshold value is.

13. The information providing system according to claim 9, wherein
the device includes a sound collecting device installed thereon; and
the organism recognizing unit is further configured to initiate the recognizing of the organism in response to acquiring a speech uttered by the user with the sounding collecting device.

14. The information providing system according to claim 9, wherein
the device comprises a wearable device worn by the user.

15. The information providing system according to claim 9, wherein
the device comprises a working machine performing a work while autonomously traveling in a working area.

* * * * *